United States Patent [19]

Katayama et al.

[11] 4,438,972

[45] Mar. 27, 1984

[54] OPERATING MECHANISM FOR OPERATING A SLIDING AND TILTING ROOF-PANEL

[75] Inventors: Yoshinori Katayama, Tokyo; Ryoji Fujiwara, Mizuho; Tsunetoshi Nishimaki, Yokosuka, all of Japan

[73] Assignees: Nissan Motor Company, Limited, Kanagawa; Johnan Seisakusho Company, Limited, Nagano, both of Japan

[21] Appl. No.: 258,465

[22] Filed: Apr. 28, 1981

[51] Int. Cl.³ .............................. B60J 7/02; H02P 5/06
[52] U.S. Cl. ........................................ 296/223; 49/210; 49/221; 296/221; 318/266
[58] Field of Search ................. 296/223; 49/210, 220, 49/221, 325, 352, 360; 318/282, 266

[56] References Cited

U.S. PATENT DOCUMENTS

| Re. 28,346 | 2/1975 | Kilianstadten et al. | 296/137 F |
| Re. 28,346 | 2/1975 | Kouth et al. | 296/223 |
| 3,688,173 | 8/1972 | Ballou | 318/267 |
| 4,081,926 | 4/1978 | Jardin | 296/223 |
| 4,134,052 | 1/1979 | Wanlass et al. | 318/282 |
| 4,164,692 | 8/1979 | Mitterer et al. | 318/266 |
| 4,272,123 | 6/1981 | Mori | 296/223 |

FOREIGN PATENT DOCUMENTS

| 1024373 | 2/1958 | Fed. Rep. of Germany . |
| 1036105 | 1/1959 | Fed. Rep. of Germany . |
| 1906084 | 10/1970 | Fed. Rep. of Germany . |
| 2550991 | 5/1977 | Fed. Rep. of Germany . |
| 2656404 | 6/1977 | Fed. Rep. of Germany . |
| 2626014 | 10/1977 | Fed. Rep. of Germany . |
| 7629034 | 3/1978 | Fed. Rep. of Germany . |
| 2017544 | 5/1970 | France . |
| 2120699 | 8/1972 | France . |
| 2292096 | 6/1976 | France . |
| 2327664 | 5/1977 | France . |
| 53-41063 | 3/1978 | Japan . |
| 1139072 | 1/1969 | United Kingdom . |

*Primary Examiner*—Richard A. Bertsch
*Attorney, Agent, or Firm*—Lowe, King, Price & Becker

[57] ABSTRACT

An operating mechanism for operating a sliding and tilting roof panel includes an electric motor driving the panel through a cable. A rack and a pinion are arranged so that the rack will be pushed by the cable and the pinion will be rotated by the rack. A switch operating member engages with the pinion so as to be moved according to the rotation of the pinion. Additionally, first and second limit switches are operated by the switch operating member. The first limit switch is operated to cut off the actuation of the motor when the roof is slid to its fully closed position, and the second limit switch is operated to cut off the actuation of the motor when the roof is tilted to its fully closed position, so that the roof is automatically stopped at its fully closed position when the roof is slid or tilted. The first and second limit switches are so arranged that just when the first limit switch starts to be operated the second limit switch takes a position just short of operation.

6 Claims, 12 Drawing Figures

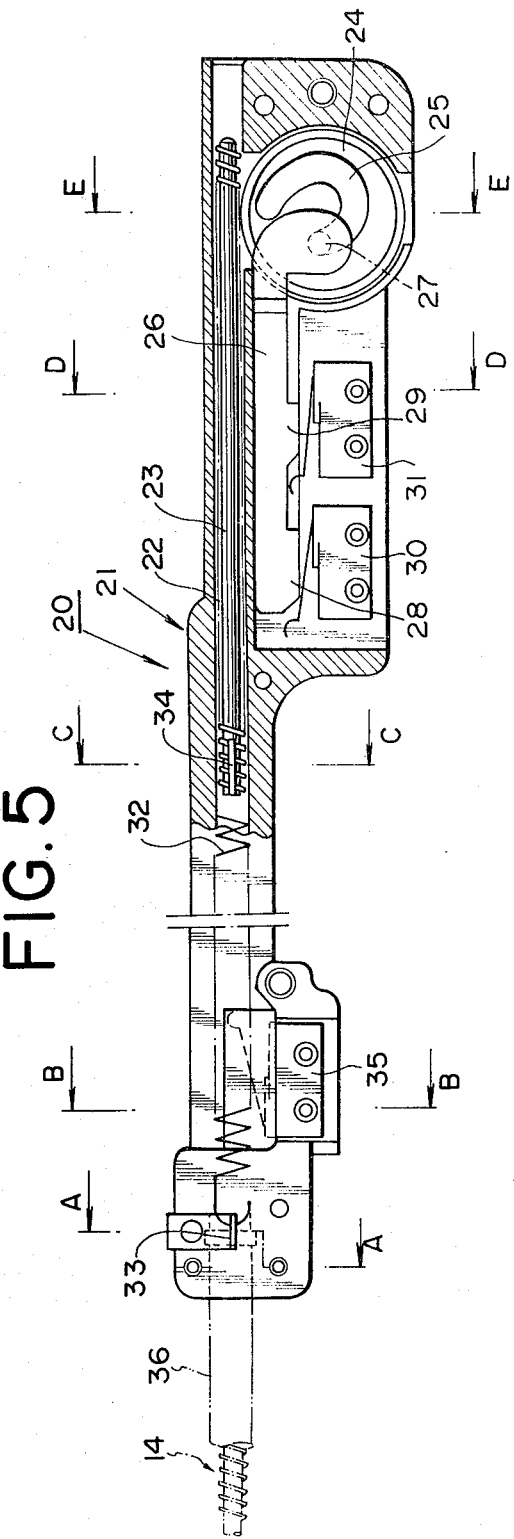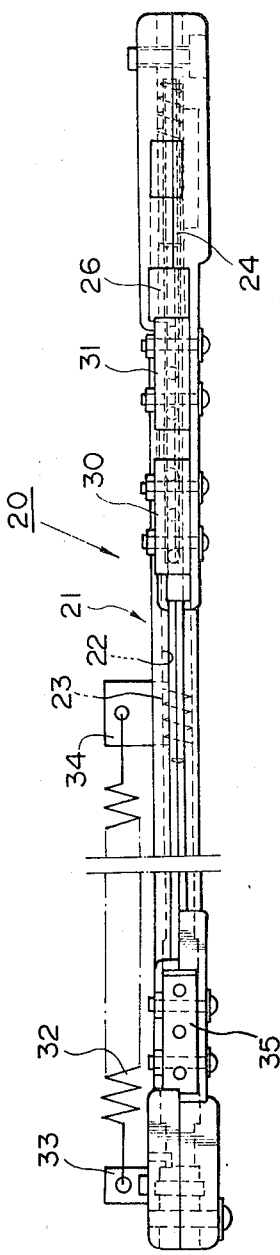

4,438,972

OPERATING MECHANISM FOR OPERATING A SLIDING AND TILTING ROOF-PANEL

BACKGROUND OF THE INVENTION

This invention relates to a switch-mechanism for operating a sliding and tilting roof panel of a vehicle driven by an electric motor.

A pivotable sliding roof panel of a vehicle is disclosed in, for example, U.S. Pat. No. Re. 28,346, U.S. Pat. No. 4,164,692, and Japanese Utility Model Application No. 53-41063 (Publication not examined No. 54-144516). The panel is slid to open and close an opening in the vehicle roof, and is tilted to open one side of the opening.

An operating mechanism for such a panel is also found in the above U.S. Pat. No. 4,164,692 and the Japanese Utility Model Application No. 53-41063. The operating mechanism tends to be relatively complex in construction and large in size.

SUMMARY OF THE INVENTION

Accordingly, it is an object of the present invention to provide a switch-mechanism for operating a sliding and tilting roof panel of a vehicle, which has a relatively simple construction and a small size.

The switch-mechanism for operating a sliding and tilting roof panel of the present invention contains an electric motor driving the sliding and tilting roof panel to tilt or slide the same by means of a rigid cable. A rack is pushed by the cable, while a pinion engaging the rack is rotated according to the movement of the rack. A switch operating member engages the pinion so as to be moved according to the rotation of the pinion.

Additionally, first and second limit switches are arranged to be operated by the switch operating member. The first limit switch is operated to cut off the actuation of the motor when the roof panel is slid to its fully closed position, while the second limit switch is operated to cut off the actuation of the motor when the roof panel is tilted to its fully closed position, so that the roof panel will be automatically stopped at its fully closed position when it is slid or tilted down.

The above and further objects, features and advantages of the present invention will become more obvious from the following description of a preferred embodiment thereof, taken in conjunction with the drawings.

BRIEF DESCRIPTION OF THE DRAWINGS

FIG. 5 is a plan view partly in section of a switch system according to the present invention;

FIG. 6 is a bottom view of the switch system of FIG. 5;

DETAILED DESCRIPTION OF THE PREFERRED EMBODIMENT

Figure 1:
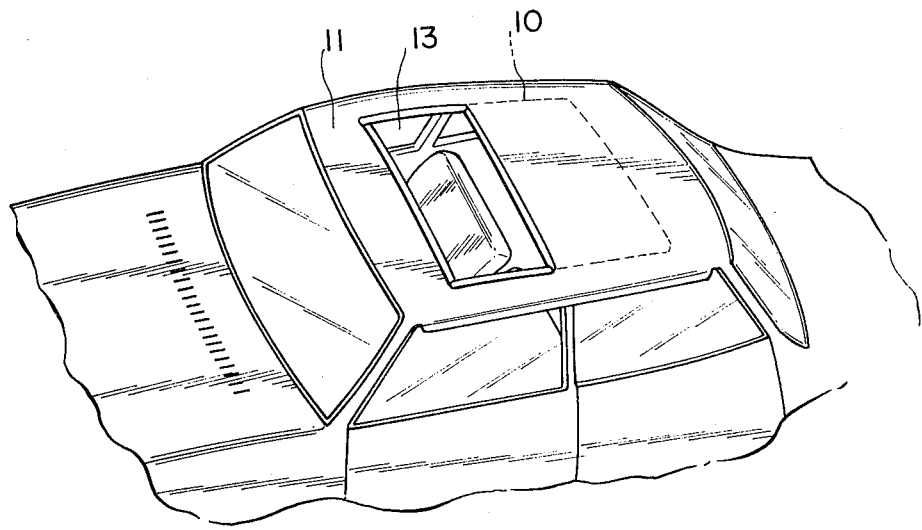
FIG. 1 is a perspective view of a conventional sliding and tilting panel of a vehicle roof, which is incorporated in the present invention.

FIGS. 1 to 4 show a sliding and tilting panel 10 of a vehicle roof 11 driven by a reversible electric motor 12, which is same as that disclosed in the aforementioned U.S. Pat. No. 4,164,692 and Japanese U. M. Application No. 53-41063. The motor 12 either tilts or slides back the panel 10 from an opening 13 in the roof 11 by means of a rigid push-pull cable 14, a transport bridge 15 and a lever arm 16.

Figure 2:
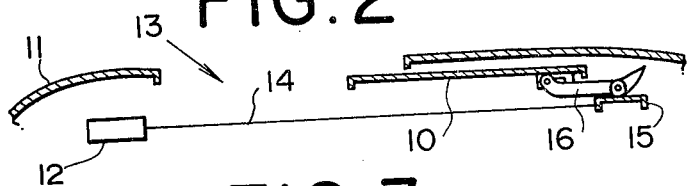
FIG. 2 is a side schematic view of the roof of FIG. 1 with the panel in its open position.
Figure 3:
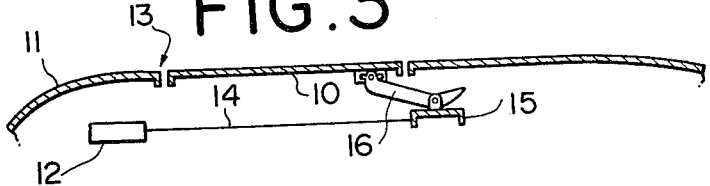
FIG. 3 is a side schematic view of the roof of FIG. 1 with the panel in its fully closed position.
Figure 4:
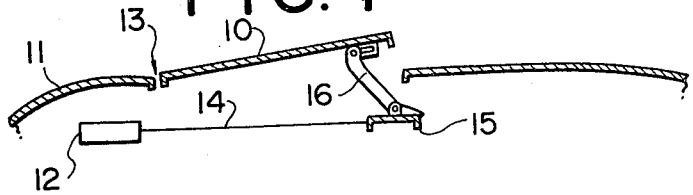
FIG. 4 is a side schematic view of the roof of FIG. 1 with the panel in its tilted position.
Figure 7A:
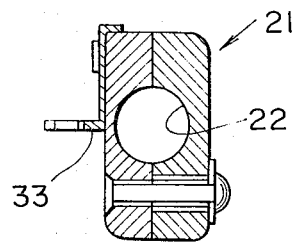
FIGS. 7a, 7b, 7c, 7d, and 7e are sections taken along the lines A-A, B-B, C-C, D-D, and E-E in FIG. 5, respectively.
Figure 7B:
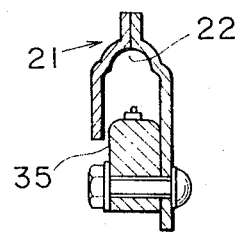
Figure 7C:
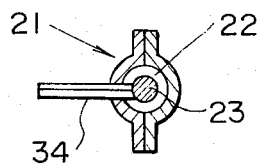
Figure 7D:
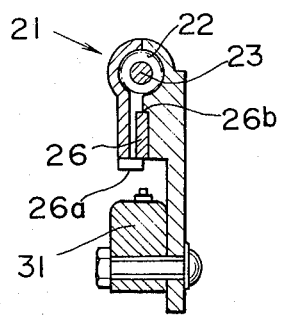
Figure 7E:
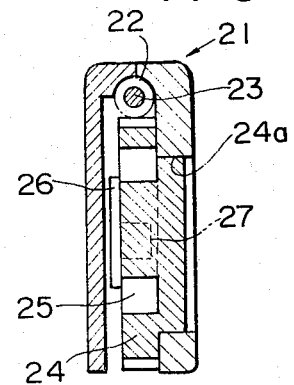

When the motor 12 operates and pulls the rod 14, the panel 10, initially in its open position as shown in FIG. 2, is slid forward to close the opening 13 as shown in FIG. 3 and is then tilted to its final tilted position as shown in FIG. 4. When the motor 12 rotates reversely, the panel 10 is returned from the tilted position to the open position via the closed position.

Referring now to FIGS. 5 to 7e, there is shown a switch system 20 having an elongated frame 21 formed therein with a longitudinally extending guide hole 22, in which a rack 23 is slideably disposed. The frame 21 supports a pinion 24 by means of a support 24a, meshing with the rack 23 to rotate according to the longitudinal movement of the rack 23. The pinion 24 has an approximately circumferentially extending groove 25.

A long flat switch operating member 26 is supported on the frame 21 by supports 26a and 26b so as to slide longitudinally, and engages at its base with the pinion 24 through a pin 27 mounted on the switch operating member 26 and fitted into the groove 25 in the pinion 24. The distance between the groove 25 and the rotational axis of the pinion 24 varies gradually with the circumferential position of the groove so that the switch operating member 26 will be moved leftwards gradually as the pinion 24 is rotated clockwise according to the rightward movement of the rack 23. The switch operating member 26 is furnished with projections 28 and 29 which operate limit switches 30 and 31 respectively placed near the projections 28 and 29. In this case, since the displacement of the switch operating member 26 can be made small and the frame 21 can be tailored to have a thickness slightly greater than the thicknesses of the pinion 24 or the cable 14, the switch system 20 can be designed to have a relatively small size. The limit switches 30 and 31 are mounted on the frame 21 near the projections 28 and 29 of the switch operating member 26 in such a manner that just as the limit switch 30 meets the projection 28 and is operated by the latter by the leftward movement of the switch operating member 26, the other limit switch 31 takes a position just before meeting the projection 29.

The rack 23 is of a column shape with helical teeth on its outer face, engaging the pinion teeth so that the engagement timings of the switches 30, 31 and the projections 28, 29 respectively, namely the operation timings of the switches 30 and 31, can be adjusted by rotating the rack 23 about its longitudinal axis when the rack 23 comes partially out of the guide hole 22 at the end of its journey.

A return spring 32 is connected at the one end to a bracket 33 carried on the frame 21 and at the other end to a clamp 34 carried on the rack 23, so as to urge the rack 23 leftwards with respect to the frame 21 in FIG.

5. A safety limit switch 35 is placed near the end of the guide hole 22 in the frame 21.

The switch system 20 is placed near the side of a frame (not shown) mounting the panel 10 to the roof 11 (see FIGS. 1 to 4). A guide sleeve 36 is attached to the end of the switch system frame 21, so as to be coaxial with the guide hole 22 in the frame 21.

Figure 8:
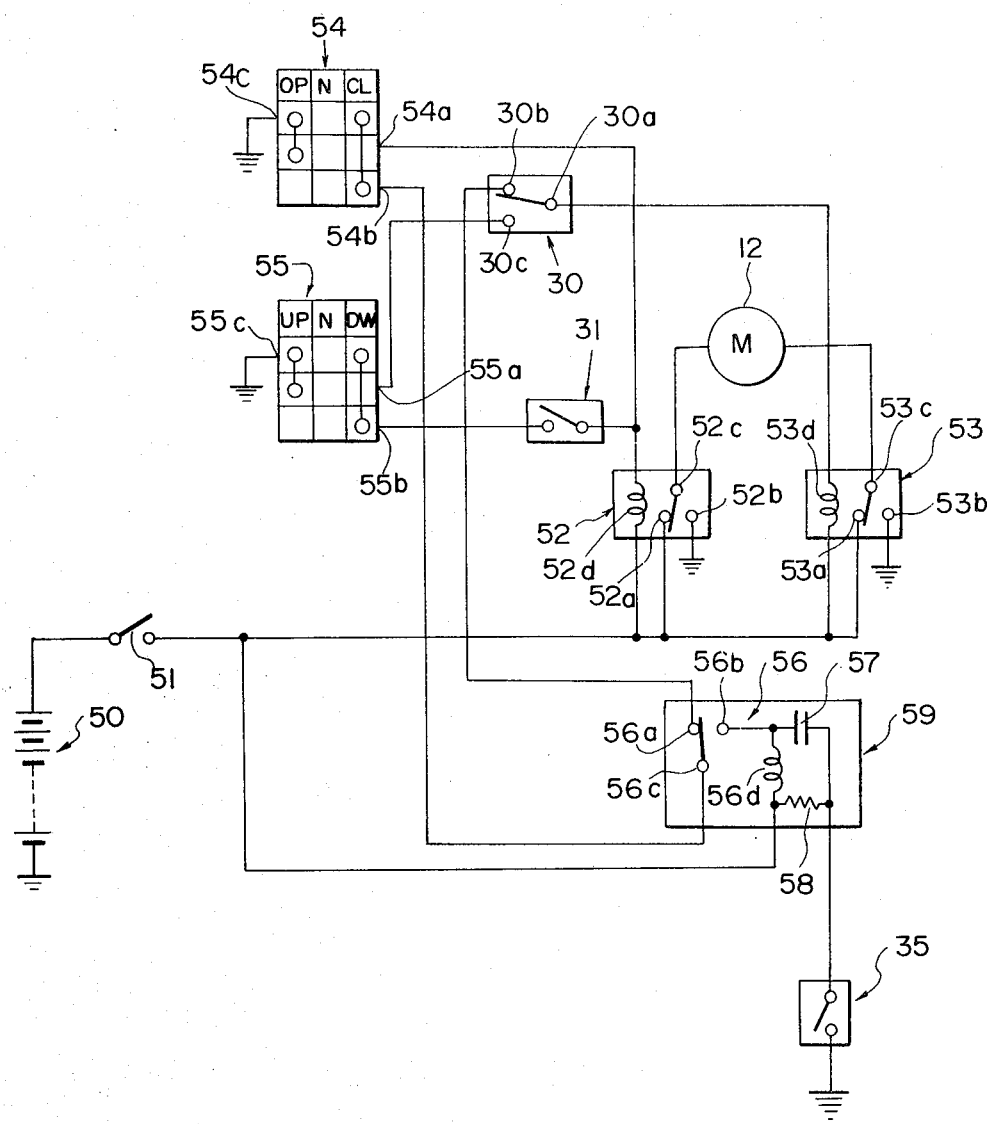
FIG. 8 is a circuit diagram of a control system incorporating the switches of FIG. 5 according to the present invention.

FIG. 8 shows a control system which incorporates the switch system 20. The positive pole of a battery 50 is connected to one contact of an ignition switch 51 of the vehicle engine, while the engine pole of the battery 50 is grounded. The other contact of the ignition switch 51 is connected to the fixed contacts 52a and 53a of relays 52 and 53 respectively and to the movable contact 30a of the limit switch 30 through the control winding 53d of the relay 53. The relay 52 takes one position where the contacts 52a and 52c are connected when the control winding 52d is deenergized and the other position where the contacts 52b and 52c are connected when the control winding 52d is energized. The relay 53 takes one position where the contacts 53a and 53c are connected when the control winding 53d is deenergized and the other position where the contacts 53b and 53c are connected when the control winding 53d is energized. The limit switch 30 takes one position where the contacts 30a and 30b are connected when it is not operated by the projection 28 and the other position where the contacts 30a and 30c are connected when it is operated by the projection 28. The other contact of the ignition switch 51 is also connected to a contact 54a of a slide operation switch 54 through the control winding 52d of the relay 52 and to a contact 55b of a tilt operation switch 55 through the control winding 52d of the relay 52 and the limit switch 31, and also to a fixed contact 56b of a relay 56 through the control winding 56d of the relay 56. The limit switch 31 is opened when it is not operated by the projection 29 and closed when it is operated by the projection 29. The relay 56 takes one position where the contacts 56a and 56c are connected when the control winding 56d is deenergized and the other position where the contacts 56b and 56c are connected when the control winding 56d is energized.

A series combination of a capacitor 57 and the safety limit switch 35 is connected between the fixed contact 56b of the relay 56 and the ground. The safety limit switch 35 is opened when it is not operated by the cable 14 and closed when it is operated by the cable 14. A resistor 58 is connected at one end to the junction of the capacitor 57 and the switch 35, and at the other end to the junction of the ignition switch 51 and the control winding 56d of the relay 56. The relay 56 along with the capacitor 57 and the resistor 58 constitutes a safety circuit 59.

The other fixed contact 56a of the relay 56 is connected to the fixed contact 30b of the limit switch 30, while the movable contact 56c of the relay 56 is connected to a contact 54b of the slide operation switch 54. The other fixed contact 30c of the limit switch 30 is connected to a contact 55a of the tilt operation switch 55. The electric motor 12 is connected across the movable contacts 52c and 53c of the relays 52 and 53 respectively. The other fixed contacts 52b and 53b of the relays 52 and 53 respectively, and the contacts 54c and 55c of the operation switches 54 and 55 respectively are all grounded.

In operation, when the ignition switch 51 is turned on and the slide operation switch 54 is shifted to the "open" position OP, the control winding 52d of the relay 52 is energized to cause the movable contact 52c to touch the fixed contact 52b and consequently a current flows from the battery 50 to the ground via the ignition switch 51, the contacts 53a and 53c of the relay 53, the motor 12, and the contacts 52c and 52b of the relay 52. Thus the motor 12 is actuated to open the panel 10.

When the slide operation switch 54 is then shifted from the "open" position OP to the "close" position CL, the current through the control winding 52d of the relay 52 is cut off while a current begins to flow from the battery 50 to the ground via the ignition switch 51, the control winding 53d of the relay 53, the limit switch 30, the contacts 56a and 56c of the relay 56, and the switch 54. Thus the control winding 53d of the relay 53 is energized to cause the movable contact 53c to touch the fixed contact 53b, and consequently a current flows from the battery 50 to the ground via the ignition switch 51, the contacts 52a and 52c of the relay 52, the motor 12, and the contacts 53c and 53b of the relay 53. Thus the motor 12 is made to rotate reversely to pull the cable 14, closing the panel 10.

The end of the cable 14 enters the guide hole 22 with the guidance by the sleeve 36, and is constructed so as to turn on the safety limit switch 35 when the panel 10 is in a position approximately 100 mm away from its fully closed position. In this way the control winding 56d of the relay 56 is energized, causing the movable contact 56c to touch the fixed contact 56b. Once the contact 56c touches the contact 56b, the control winding 56d remains energized since the slide operation switch 54 is in the "closed" position CL. The energization of the control winding 53d of the relay 53 is stopped with the disconnection of the contacts 56a and 56c of the relay 56, stopping the motor 12 to stop the movement of the panel 10, so as to protect anybody carelessly caught between the panel 10 and the roof 11.

After the panel 10 is stopped by the closing of the safety switch 35, the movable contact 56c touches the fixed contact 56a of the relay 56 when the slide operation switch 54 is shifted to its neutral position N. When the slide operation switch 54 is shifted to its "closed" position CL again, the panel 10 again slides toward its fully closed position since the capacitor 57 is fully charged to obstruct energization of the control winding 56d of the relay 56. Consequently, the end of the cable 14 further advances rightwards in the guide hole 22, meeting the end of the rack 23 and then moving the rack 23 rightwards. As a result of the rightward movement of the rack 23, the pinion 24 is rotated clockwise, moving the switch operating member 26 leftwards. In this case, the range of movement of the switch operating member 26 is extremely small compared to that of the cable 14, since the switch operating member 26 moves according to the slight variation of the eccentricity of the groove 25 in the pinion 24.

When the projection 28 of the switch operating member 26 meets the limit switch 30, the former operates the latter, stopping the motor 12 and thus the panel 10 at its fully closed position, since the movable contact 30a disconnects itself from the fixed contact 30b of the switch 30 to stop the energization of the control winding 53d of the relay 53 and contacts the fixed contacts 30c. Simultaneously, the other projection 29 takes a position just before meeting the limit switch 31. In this condition where the panel 10 is fully closed as shown in FIG. 3 and the limit switch 30 is operated to cut off the actuation of the motor 12 and to stop the same, the tilt operation switch 55 controls the motor 12 instead of the slide operation switch 54 since the movable contact 30a touches the fixed contact 30c instead of the fixed contact 30b of the limit switch 30.

When the panel 10 is fully closed, and the tilt operation switch 55 is shifted to its "up" position UP, the control winding 53d of the relay 53 is energized to cause the movable contact 53c to touch the fixed contact 53b by means of the connection between the contacts 30a and 30c of the limit switch 30. Thus a current flows from the battery 50 through the ignition switch 51, contacts 52a and 52c of the relay 52, the motor 12, and contacts 53c and 53b of the relay 53, actuating the motor 12 to pull the cable 14 further. Then the panel 10 is turned about its forward end, so that the panel 10 comes into the tilted position as shown in FIG. 4. Simultaneously, the rack 23 is moved rightwards to further rotate the pinion 24 clockwise by means of the movement of the cable 14, and consequently the switch operating member 26 is further moved leftwards to cause the projection 29 to meet the limit switch 31, turning on the latter.

When the tilt operation switch 55 is shifted to its "down" position DW, the control winding 52d of the relay 52 is energized via the limit switch 31 to cause the movable contact 52c to touch the fixed contact 52b while the control winding 53d of the relay 53 is de-energized to cause the movable contact 53c to touch the fixed contact 53a, so that the motor 12 rotates reversely to return the panel 10 from the condition shown in FIG. 4 to that shown in FIG. 3. Simultaneously, the rack 23 is moved leftwards in the guide hole 22 by the return spring 32 according to the leftward movement of the cable 14, rotating the pinion 24 counterclockwise, thereby moving rightwards the switch operating member 26. Thus, when the projection 29 is disconnected from the limit switch 31 to turn off the latter, the motor 12 is stopped at the completion of the tilt down operation since the contact 52c is disconnected from the contact 52b of the relay 52 and connected with the contacts 52a to cut off the current supply to the motor 12. Consequently the panel 10 is returned to its fully closed position as shown in FIG. 3. At this time, the other projection 28 is positioned just short of its disconnection from the limit switch 30.

In this condition, when the slide operation switch 54 is shifted to its "open" position OP, the motor 12 operates in the same way as in the above tilt down operation to slide the panel 10 backwards. Then the rack 23 is further moved leftwards by the return spring 32 according to the leftward movement of the cable 14, moving rightwards the switch operating member 26 via the pinion 24, so that the projection 28 of the member 26 is disconnected from the limit switch 30. The rack 23 stops moving on returning to the position shown in FIG. 5, whereas the cable 14 keeps moving leftwards and leaves the guide hole 22, turning off the safety limit switch 35. Then the capacitor 57 discharges via the registor 58 and the control winding 56d of the relay 56.

The limit switches 30 and 31 thus function to properly stop and maintain the panel 10 in its fully closed position.

While a preferred embodiment has been described, it is to be understood that changes and variations may be made without departing from the spirit or scope of the present invention which are delineated by the following claims.

What is claimed is:

1. An operating mechanism for operating a sliding and tilting roof panel of an automobile and the like, the tilting movement of the roof panel being started after the sliding movement of the roof panel to return the roof panel to its fully closed position is completed, the sliding movement of the roof panel being started after the tilting movement of the roof panel to return the roof panel to its fully closed position is completed, comprising:
   (a) an electric motor;
   (b) a cable connected to the motor, whereby the cable is moved when the motor is electrically actuated, the cable being also connected to the roof panel, whereby the motor drives the roof panel via the cable when electrically actuated;
   (c) a rack engaging the cable, whereby the rack is moved according to the movement of the cable;
   (d) a pinion meshing with the rack to be rotated according to the movement of the rack;
   (e) a switch-operating member engaging the pinion so as to be moved according to the rotation of the pinion, whereby the position of the switch-operating member represents the position of the roof panel; and
   (f) first and second limit switches operated by the switch-operating member, the first switch being operated to cut off the electrical actuation of the motor when the roof panel is slid to its fully closed position, the second switch being operated to cut off the electrical actuation of the motor when the roof panel is tilted to its fully closed position;
   whereby the roof panel is automatically stopped at its fully closed position when the roof panel is slid or tilted to its fully closed position.

2. An operating mechanism as defined by claim 1, wherein the first and second limit switches are so arranged that just when the first limit switch starts to be operated the second limit switch takes a position just short of operation.

3. An operating mechanism as defined by claim 2, further comprising a frame having therein a guiding hole into which the cable is movable to meet the rack and in which the rack is slideably disposed, the frame carrying the pinion, the switch-operating member, and the first and the second limit switches.

4. An operating mechanism as defined by claims 1, 2 or 3, wherein the pinion has a groove and the switch-operating member has a pin fitted into the groove, the groove extending approximately circumferentially in such a manner that the distance between the groove and the rotational axis of the pinion varies gradually with the circumferential position of the groove, whereby the switch-operating member moves according to the rotation of the pinion.

5. An operating mechanism as defined by claims 1, 2 or 3, further comprising a safety limit switch operated by the cable so as to cut off the electrical actuation of the motor and to stop the roof at a position adjacent to its fully closed position when the roof is slid toward its fully closed position.

6. An operating mechanism as defined by claims 1, 2 or 3, wherein the rack is of a column shape with helical teeth on its outer face engaging the pinion, whereby the engagement relation of the rack and pinion can be adjusted by rotating the rack about its longitudinal axis.

* * * * *